United States Patent
Jin et al.

(10) Patent No.: US 10,590,313 B2
(45) Date of Patent: *Mar. 17, 2020

(54) HOT MELT ADHESIVE COMPOSITION

(71) Applicant: Dow Global Technologies LLC, Midland, MI (US)

(72) Inventors: Yi Jin, Missouri City, TX (US); Kim Walton, Lake Jackson, TX (US); Gary Marchand, Gonzales, LA (US); Selim Yalvac, Pearland, TX (US); Allan W. McLennaghan, Lachen (CH); Kate Brown, Houston, TX (US); Carl Iverson, Houston, TX (US); Cynthia Rickey, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/031,401

(22) Filed: Jul. 10, 2018

(65) Prior Publication Data

US 2018/0320033 A1 Nov. 8, 2018

Related U.S. Application Data

(63) Continuation of application No. 15/505,398, filed as application No. PCT/US2015/046094 on Aug. 20, 2015, now Pat. No. 10,023,771.

(Continued)

(51) Int. Cl.
*C08F 10/06* (2006.01)
*C09J 123/12* (2006.01)

(Continued)

(52) U.S. Cl.
CPC ........... *C09J 123/16* (2013.01); *C08K 5/0083* (2013.01); *C08L 91/06* (2013.01); *C09J 11/06* (2013.01);

(Continued)

(58) Field of Classification Search
None
See application file for complete search history.

(56) References Cited

U.S. PATENT DOCUMENTS 8,921,464 B2 12/2014 Liu et al.
10,023,770 B2 * 7/2018 McLennaghan ....... C09J 123/16

(Continued)

FOREIGN PATENT DOCUMENTS

WO 2006/069205 A1 6/2006
WO 2009/067337 A1 5/2009

(Continued)

*Primary Examiner* — Richard A Huhn
(74) *Attorney, Agent, or Firm* — Quarles & Brady LLP (57) ABSTRACT

The present disclosure provides a composition. In an embodiment an adhesive composition is provided and includes
A) a propylene based plastomer or elastomer (PBPE) comprising up to 10 wt % units derived from ethylene and having
(i) a Koenig B-value less than 1.0;
(ii) a total unsaturation per mole of propylene from 0.01% to 0.03%;
(iii) a density from 0.870 g/cc to 0.890 g/cc;
(iv) a melt viscosity at 177° C. from 800 mPa·s to 11,000 mPa·s; and
(v) a weight average molecular weight from 20,000 to 50,000 g/mol;
B) a tackifier; and
C) a wax.

20 Claims, 2 Drawing Sheets

Related U.S. Application Data (60) Provisional application No. 62/040,123, filed on Aug. 21, 2014.

(51) Int. Cl.
    *C09J 123/16*     (2006.01)
    *C08K 5/00*     (2006.01)
    *C08L 91/06*     (2006.01)
    *C09J 11/06*     (2006.01)
    *C09J 11/08*     (2006.01)
    *C08F 210/06*     (2006.01)
    *C08L 23/16*     (2006.01)
    *C08K 5/103*     (2006.01)

(52) U.S. Cl.
    CPC ............... *C09J 11/08* (2013.01); *C08F 10/06* (2013.01); *C08F 210/06* (2013.01); *C08F 2500/08* (2013.01); *C08F 2500/17* (2013.01); *C08F 2800/20* (2013.01); *C08K 5/103* (2013.01); *C08L 23/16* (2013.01); *C08L 2314/06* (2013.01); *C09J 123/12* (2013.01)

(56) References Cited

U.S. PATENT DOCUMENTS

| | | | |
|---|---|---|---|
| 10,023,771 B2 * | 7/2018 | Jin | .......................... C09J 123/16 |
| 2004/0127614 A1 | 7/2004 | Jiang et al. | |
| 2005/0288412 A1 | 12/2005 | Hohner et al. | |
| 2007/0251572 A1 * | 11/2007 | Hoya | ................... C08L 23/0815 |
| | | | 136/256 |
| 2008/0085977 A1 * | 4/2008 | Okamoto | ................ C08L 23/10 |
| | | | 525/240 |
| 2009/0105407 A1 * | 4/2009 | Karjala | ................... C08F 10/00 |
| | | | 524/547 |
| 2011/0172348 A1 | 7/2011 | Hoya et al. | |
| 2012/0328805 A1 | 12/2012 | Davis | |
| 2012/0329929 A1 | 12/2012 | Miller et al. | |
| 2013/0005884 A1 | 1/2013 | Davis et al. | |
| 2017/0240781 A1 | 8/2017 | McLennaghan | |

FOREIGN PATENT DOCUMENTS

| | | |
|---|---|---|
| WO | 2012/068576 A2 | 5/2012 |
| WO | 2016/029012 A1 | 2/2016 |

\* cited by examiner

HOT MELT ADHESIVE COMPOSITION

REFERENCE TO RELATED APPLICATIONS

The present application is a continuation of U.S. application Ser. No. 15/505,398, filed Feb. 21, 2017, which is a 371 of international application no. PCT/US2015/046094, filed Aug. 20, 2015, which claims priority to U.S. Provisional Application Ser. No. 62/040,123, filed Aug. 20 2014, the entire content of which is incorporated by reference herein to the extent that the language is not inconsistent with the instant application.

FIELD

The instant disclosure relates to a composition suitable for adhesive applications, and hot melt adhesive applications in particular.

BACKGROUND

Compositions for conventional hot-melt adhesive (HMA) formulations follow a general rule of thumb of containing ⅓ polymer, ⅓ tackifier and ⅓ wax. Due to the short supply and increasing cost of tackifier, market demand is growing for HMA formulations containing greater polymer content and less tackifier. However, reducing the amount of tackifier and increasing the amount of polymer has the drawback of deteriorated adhesion and increasing the set time of the HMA composition when using traditional polymers such as ethylene vinyl acetate (EVA) and polyethylene copolymers.

A need exists for a HMA composition with reduced tackifier, while maintaining suitable adhesion properties and a rapid set time compatible with high-speed line processing applications.

A need further exists for HMA composition with a propylene-based polymer having improved high temperature resistance, improved adhesion properties, improved substrate compatibility, and/or improved thermal stability.

SUMMARY

The instant disclosure provides a composition suitable for holt-melt adhesive applications.

The present composition provides a composition. In an embodiment, an adhesive composition is provided and includes (A) a propylene based plastomer or elastomer (PBPE) comprising up to 10 wt % units derived from ethylene and having
  (i) a Koenig B-value less than 1.0;
  (ii) a total unsaturation per mole of propylene from 0.010% to 0.030%;
  (iii) a density from 0.870 g/cc to 0.890 g/cc;
  (iv) a melt viscosity at 177° C. from 800 mPa·s to 11,000 mPa·s, further from 900 mPa·s to 11,000 mPa·s, and further from 1,000 mPa·s to 11,000 mPa·s; and
  (v) a weight average molecular weight from 20,000 to 50,000 g/mol;
B) a tackifier; and
C) a wax.

DETAILED DESCRIPTION

The instant disclosure provides a composition suitable for holt-melt adhesive applications. The adhesive composition includes:
  (A) a propylene based plastomer or elastomer,
  (B) a tackifier,
  (C) a wax,
  (D) optional antioxidant, and
  (E) optional sorbitol-based nucleating agent.

In an embodiment, the composition is hot melt adhesive (HMA) composition. Although the following disclosure is directed to HMA compositions, it is understood that the following disclosure is applicable to other adhesive compositions, such as pressure sensitive adhesive compositions, for example.

A. Propylene-Based Plastomer or Elastomer

The present HMA composition includes a propylene based plastomer or elastomer. A "propylene-based plastomer or elastomer" (or "PBPE") is a propylene/ethylene copolymer and includes at least 50 weight percent of units derived from propylene and up to 10 wt % ethylene comonomer. All individual values and subranges from 1 wt % to 10 wt % are included and disclosed herein. For example, the ethylene content can be from a lower limit of 1, 3, 4, or 5, wt % to an upper limit of 7, 8, 9, or 10 wt %.

1. PBPE Catalyst

The PBPE is made with a (i) catalyst that is a Group IV metal complex of a polyvalent aryloxyether, (ii) an activator, and/or (iii) a cocatalyst. The catalyst is capable of producing polymers from propylene containing monomer mixtures having extremely high molecular weight and isotacticity, at catalyst efficiencies of greater than 0.5 $g_{polymer}/\mu g_{metal}$ allowing the use of a chain transfer agent to control molecular weight without sacrificing molecular weight distribution. A sufficient quantity of chain transfer agent is used so that a substantial decrease in molecular weight (>30 percent) occurs compared to a comparative polymerization without the use of chain transfer agent. When the chain transfer agent is hydrogen, at least 0.01 mol percent (based on propylene) is used, and a maximum of about 2 mole percent is used. Highly isotactic polymers can be prepared with high levels of chain transfer agents, while still affording narrow molecular weight distribution polymers and using low levels of alumoxane activators. Generally, use of high levels of chain transfer agent with more conventional catalysts results in production of polymers having broadened molecular weight distributions. Nonlimiting examples of suitable Group IV metals include titanium, zirconium, and hafnium.

In an embodiment, the Group IV metal complex is a hafnium-based polyvalent a ryloxyether.

Nonlimiting examples of suitable Group IV metal complex of a polyvalent aryloxyether include [[2',2'''-[(1R,2R)-1,2-cylcohexanediylbis(methyleneoxy-κO)] bis[3-(9H-carbazol-9-yl)-5-methyl[1,1'-biphenyl]-2-olato-κO]](2-)] dimethyl hafnium; and [[2',2'''-[1,3-propanediylbis(oxy-κO)]bis-{3-[9H-3,6-di-(1,1-dimethylethyl)-carbazol-9-yl]}-5'-fluoro-5-(1,1,3,3-tetramethylbutyl)-[1,1'-biphenyl]-2-olato-κO]](2-)]dimethyl hafnium.

The metal complexes are activated in various ways to yield catalyst compounds having a vacant coordination site that will coordinate, insert, and polymerize addition polymerizable monomers, especially olefin(s). For the purposes of this patent specification and appended claims, the term "activator" or "cocatalyst" means any compound or component or method which can activate the metal complex in the foregoing manner. Non-limiting examples of suitable activators include Lewis acids, non-coordinating ionic activators, ionizing activators, organometallic compounds, and combinations of the foregoing substances capable of converting the neutral metal complex to a catalytically active species.

In an embodiment, catalyst activation may involve formation of a cationic, partially cationic, or zwitterionic species, by means of proton transfer, oxidation, or other suitable activation process. The present invention is operable and fully enabled regardless of whether or not such an identifiable cationic, partially cationic, or zwitterionic species actually results during the activation process, also known as an "ionization" process or "ionic activation process".

Ionizing cocatalysts may contain an active proton, or some other cation associated with, but not coordinated to or only loosely coordinated to, an anion of the ionizing compound. Nonlimiting examples include ammonium cation containing salts, especially those containing trihydrocarbyl-substituted ammonium cations containing one or two $C_{10-40}$alkyl groups, especially methylbis(octodecyl)-ammonium- and methylbis(tetradecyl)-ammonium-cations and a non-coordinating anion, especially a tetrakis(perfluoro)aryl-borate anion, especially tetrakis(pentafluorophenyl)borate. The cation may comprise a mixture of hydrocarbyl groups of differing lengths. For example, the protonated ammonium cation derived from the commercially available long-chain amine comprising a mixture of two $C_{14}$, $C_{16}$ or $C_{18}$ alkyl groups and one methyl group. Such amines are available from Chemtura Corp., under the trade name Kemamine(™) T9701, and from Akzo-Nobel under the trade name Armeen (™) M2HT. A most preferred ammonium salt activator is methyl di($C_{14-20}$ alkyl)ammonium tetrakis(pentafluorophenyl)borate.

Another suitable class of organometallic activators or cocatalysts is alumoxanes, also referred to as alkylaluminoxanes. Alumoxanes are well known activators for use with metallocene type catalyst compounds to prepare addition polymerization catalysts. Nonlimiting examples include alumoxanes that are Lewis acid modified alumoxanes, especially tri($C_{3-6}$)alkylaluminum modified methylalumoxane, including tri(isobutyl)aluminum modified methalumoxane, available commercially as MMAO-3A or tri(n-octyl)aluminum modified methalumoxane, available commercially as MMAO-12, from Akzo Nobel. Inc.

Combinations of activators are also contemplated by the present disclosure, for example, alumoxanes and ionizing activators in combination.

Within the scope of this disclosure is the use of alumoxane(s) or modified alumoxane(s) as an activator or as a tertiary component. That is, the compound may be used alone or in combination with other activators, either neutral or ionic, such as tri(alkyl)ammonium tetrakis(pentafluorophenyl)borate compounds, tris(perfluoroaryl) compounds, polyhalogenated heteroborane anions, and combinations of two or more of these materials. In this embodiment, the alumoxane may not contribute significantly to actual catalyst activation. Notwithstanding the foregoing, some participation of the alumoxane in the activation process is not necessarily excluded.

Suitable alumoxanes include polymeric or oligomeric alumoxanes, especially methylalumoxane (MAO) as well as Lewis acid-modified alumoxanes, especially trihydrocarbylaluminum-, halogenated tri(hydrocarbyl)aluminum-, or halogenated tri(hydrocarbyl)boron-modified alumoxanes, having from 1 to 10 carbons in each hydrocarbyl or halogenated hydrocarbyl group. Preferred Lewis acid-modified alumoxane compounds are tri(i-butyl)aluminum-modified methalumoxane and tri(n-octyl)aluminum modified methalumoxane containing from 10 to 30, or 15 to 25 mole percent i-butyl content and 10 to 20, or 12 to 18 mole percent n-octyl content, respectively, the molar percents based on total alkyl ligand content. The alumoxane or Lewis acid-modified alumoxane activator is preferably utilized in molar ratios of cocatalyst:catalyst from 20-200:1, more preferably from 20-150:1, and most preferably from 20-80:1.

Because of the ability to be activated at relatively low levels of alumoxane or Lewis acid-modified alumoxane cocatalysts while maintaining high catalyst efficiency, the present Group IV metal complexes can achieve reduced levels of cocatalyst by-products in the resulting polymer. This in turn allows the polymers to be employed in demanding applications such as those requiring high clarity or low dielectric constant.

2. PBPE Properties

The catalyst of Group IV metal complex of a polyvalent aryloxyether imparts unique properties to the PBPE. The PBPE is characterized as having substantially isotactic propylene sequences. "Substantially isotactic propylene sequences" means the sequences have an isotactic triad (mm) measured by $^{13}$C NMR of greater than 0.85, or greater than 0.90, or greater than 0.92, or greater than 0.93. Isotactic triads refer to the isotactic sequence in terms of a triad unit in the copolymer molecular chain determined by $^{13}$C NMR spectroscopy.

3. B-Value

The PBPE has a B-value less than 1.0 or less than 0.99, or less than 0.98, or less than 0.97. The term "B-value" is a measure of randomness and measures the distribution of the propylene and ethylene across the polymer chain of the PBPE. B-values range from 0 to 2. The higher the B-value, the more alternating the ethylene distribution in the copolymer. The lower the B-value, the more blocky or clustered the ethylene distribution in the PBPE propylene/ethylene copolymer.

The B-value as described by Koenig (Spectroscopy of Polymers American Chemical Society, Washington, D.C., 1992) is calculated as follows.

B is defined for a propylene/ethylene copolymer as:

$$B = \frac{f(EP+PE)}{2 \cdot FE \cdot FP}$$

where f(EP+PE)=the sum of the EP and PE diad fractions; and Fe and Fp=the mole fraction of ethylene and propylene in the copolymer, respectively. The diad fraction can be derived from triad data according to: f(EP+PE)=[EPE]+[EPP+PPE]/2+[PEP]+[EEP+PEE]/2. The B-values can be calculated for other copolymers in an analogous manner by assignment of the respective copolymer diads. For example, calculation of the B-value for a propylene/1-octene copolymer uses the following equation:

$$B = \frac{f(OP+PO)}{2 \cdot FO \cdot FP}$$

For PBPE polymers made with a Group IV metal complex of a polyvalent aryloxyether catalyst, the B-values are less than 1.0. In an embodiment, the PBPE has a B-value from 0.90, or 0.92, or 0.93, or 0.94 to 0.95, or 0.96, or 0.97, or 0.98, or 0.99. This means that for PBPE made with the Group IV metal complex of a polyvalent aryloxyether catalyst, not only is the propylene block length relatively long for a given percentage of ethylene but a substantial amount of long sequences of three or more sequential ethylene insertions are present in the PBPE.

4. Propylene Unsaturation

The PBPE has a total unsaturation per mole of propylene from 0.01% to 0.03%. The total unsaturation per mole of propylene is measured by $^1$H NMR analysis as described below.

$^1$H NMR Analysis

Samples are prepared by adding approximately 3.25 g of a 50/50 mixture of tetrachloroethane-d2/perchlorethylene that is 0.0015M in chromium acetylacetonate (relaxation agent) to 0.130 g sample in a 10 mm NMR tube. The samples are dissolved and homogenized by heating the tube and its contents to 110° C. The data is collected using a Bruker 400 MHz spectrometer equipped with a Bruker Dual DUL high-temperature CryoProbe. The unsaturation data is collected using 4 scans per data file, a 15.6 second pulse repetition delay with a sample temperature of 120° C. The acquisition is carried out using spectral width of 10,000 Hz and a file size of 16K data points. The presaturation experiment is run with a modified pulse sequence, lc1prf2.zz1 using 100 scans per data file.

Calculations

Moles of H from propylene

Mol fraction propylene∗(integral area δ 3.5 − 0.2 ppm)

Total moles propylene $$\frac{\text{moles H from propylene}}{6 \text{ protons}}$$

Mol % vinyl unsaturation/mol propylene $$\frac{100 * \text{moles vinyl}}{\text{Total moles propylene}}$$

Mol % *Cis/Trans* Unsaturation/mol propylene $$\frac{100 * \text{moles } cis/trans}{\text{Total moles propylene}}$$

Mol % trisubstituted unsaturation/mol propylene $$\frac{100 * \text{moles } trisub}{\text{Total moles propylene}}$$

Mol % vinylidene unsaturation/mol propylene $$\frac{100 * \text{moles vinylidene}}{\text{Total moles propylene}}$$

Total mol % unsaturation/mol propylene

Mol % vinyl+Mole *cis* & *trans* + Mol % *trisub* + Mol + vinylidene

The PBPE melt flow rate is too high to be measured. The melt viscosity at 177° C. for the PBPE is from 800 milli-Pascal-second (mPa·s), or 900 mPa·s, or 1,000 mPa·s, or 1,500 mPa·s, or 2,000 mPa·s, or 2,500 mPa·s to 4,000 mPa·s, or 7,000 mPa·s, or 10,000 mPa·s, or 11,000 mPa·s, or 13,000 mPa·s, or 15,000 mPa·s. In an embodiment, the PBPE has a melt viscosity at 177° C. from 2,000 mPa·s to 7,000 mPa·s. In another embodiment, the PBPE has a melt viscosity at 177° C. from 2,500 mPa·s to 4,000 mPa·s.

The PBPE has a crystallinity in the range of from 1 wt % to 40 wt %. For example, the crystallinity can be from 10 wt %, or 15, or 20 to 25, or 30, or 35, or 40 wt %. For example, PBPE that is propylene/ethylene copolymer may have a crystallinity in the range from 10 to 40 wt %, or 20 to 39 wt %. Crystallinity is measured via DSC method, as described below in the test methods section. The propylene/ethylene copolymer includes units derived from propylene and polymeric units derived from ethylene comonomer and optional $C_4$-$C_{10}$ α-olefin. Exemplary comonomers are $C_2$, and $C_4$ to $C_{10}$ α-olefins; for example, $C_2$, $C_4$, $C_6$ and $C_8$ α-olefins.

The PBPE has a heat of fusion ($H_f$) from 40 J/g to 80 J/g, further from 40 J/g to 75 J/g, and further from 40 J/g to 70 J/g.

The PBPE has a density from 0.850 g/cc, or 0.860 g/cc, or 0.865 g/cc, or 0.870 g/cc to 0.880 g/cc, or 0.890 g/cc, or 0.900 g/cc.

The PBPE has melting temperature, Tm, from 85° C. to 120° C., or 90° C. to 115° C., or 95° C. to 115° C.

The PBPE has a weight average molecular weight (Mw) from 20,000, or 24,000, or 30,000 to 40,000, or 48,000, or 50,000 g/mol. The PBPE has a Mw/Mn from 2.0 to 4.0.

In an embodiment, the PBPE has one, some, or all of the following properties:
(i) from 91 wt % to 98 wt % units derived from propylene and from 9 wt % to 2 wt % units derived from ethylene;
(ii) an isotactic triad (mm) measured by $^{13}$C NMR greater than 0.92;
(iii) a Koenig B-value from 0.90 to 0.95;
(iv) a total mol % unsaturation propylene from 0.015% to 0.025%;
(iii) a density from 0.870 g/cc to 0.890 g/cc;
(iv) a melt viscosity at 177° C. from 800 mPa·s to 11,000 mPa·s, further from 900 mPa·s to 11,000 mPa·s, and further from 1,000 mPa·s to 11,000 mPa·s;
(v) a melting temperature, Tm from 90° C. to 115° C.;
(vi) a heat of fusion ($H_f$) from 40 J/g to 80 J/g;
(vii) a crystallinity from 23% to 40%;
(viii) an Mw from 30,000 to 48,000 g/mol; and
(ix) a Mw/Mn from 2.0 to 3.5.

In an embodiment, the PBPE has one, some, or all of the following properties:
(i) from 93 wt % to 95 wt % units derived from propylene and from 7 wt % to 5 wt % units derived from ethylene;
(ii) an isotactic triad (mm) measured by $^{13}$C NMR greater than 0.93;
(iii) a Koenig B-value from 0.92 to 0.95;
(iv) a total mol % unsaturation propylene from 0.015% to 0.025%;
(iii) a density from 0.880 g/cc to 0.890 g/cc;
(iv) a melt viscosity at 177° C. from 800 mPa·s to 4,500 mPa·s, further from 900 mPa·s to 4,500 mPa·s, and further from 1,000 mPa·s to 4,500 mPa·s;
(v) a melting temperature, Tm from 100° C. to 105° C.;
(vi) a heat of fusion ($H_f$) from 40 J/g to 80 J/g;
(vii) a crystallinity from 25% to 35%;
(viii) a Mw from 30,000 to 40,000 g/mol; and
(ix) a Mw/Mn from 2.0 to 3.0.

The PBPE is present in the HMA composition in an amount from 55 wt %, or 60 wt %, or 65 wt %, or 69 wt % to 70 wt %, or 71 wt %, or 75 wt %, or 80 wt %, or 85 wt %, or 90 wt %. Weight percent is based on total weight of the HMA composition.

The PBPE may comprise two or more embodiments disclosed herein.

B. Tackifier

The present HMA composition includes a tackifier. The tackifier has a Ring and Ball softening temperature (measured in accordance with ASTM E 28) from 90° C., or 93° C., or 95° C., or 97° C., or 100° C., or 105° C., or 110° C. to 120° C., or 130° C., or 140° C., or 150° C. The tackifier may modify the properties of the HMA composition such as viscoelastic properties (e.g., tan delta), rheological properties (e.g., viscosity), tackiness (e.g., ability to stick), pressure sensitivity, and wetting property. In some embodiments, the tackifier is used to improve the tackiness of the composition. In other embodiments, the tackifier is used to reduce the viscosity of the composition. In particular embodiments, the tackifier is used to wet out adherent surfaces and/or improve the adhesion to the adherent surfaces.

Tackifiers suitable for the compositions disclosed herein can be solids, semi-solids, or liquids at room temperature. Non-limiting examples of suitable tackifiers include (1) natural and modified rosins (e.g., gum rosin, wood rosin, tall oil rosin, distilled rosin, hydrogenated rosin, dimerized rosin, and polymerized rosin); (2) glycerol and pentaerythritol esters of natural and modified rosins (e.g., the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin); (3) copolymers and terpolymers of natured terpenes (e.g., styrene/terpene and alpha methyl styrene/terpene); (4) polyterpene resins and hydrogenated polyterpene resins; (5) phenolic modified terpene resins and hydrogenated derivatives thereof (e.g., the resin product resulting from the condensation, in an acidic medium, of a bicyclic terpene and a phenol); (6) aliphatic or cycloaliphatic hydrocarbon resins and the hydrogenated derivatives thereof (e.g., resins resulting from the polymerization of monomers consisting primarily of olefins and diolefins); (7) aromatic hydrocarbon resins and the hydrogenated derivatives thereof; (8) aromatic modified aliphatic or cycloaliphatic hydrocarbon resins and the hydrogenated derivatives thereof; and combinations thereof.

In an embodiment, the tackifier includes aliphatic, cycloaliphatic and aromatic hydrocarbons and modified hydrocarbons and hydrogenated versions; terpenes and modified terpenes and hydrogenated versions; and rosins and rosin derivatives and hydrogenated versions; and mixtures of two or more of these tackifiers. These tackifying resins have a ring and ball softening point from 70° C. to 150° C., and will typically have a viscosity at 350° F. (177° C.), as measured using a Brookfield viscometer, of no more than 2000 mPa·s. They are also available with differing levels of hydrogenation, or saturation, which is another commonly used term. Useful examples include Eastotac™ H-100, H-115 and H-130 from Eastman Chemical Co. in Kingsport, Tenn., which are partially hydrogenated cycloaliphatic petroleum hydrocarbon resins with softening points of 100° C., 115° C. and 130° C., respectively. These are available in the E grade, the R grade, the L grade and the W grade, indicating differing levels of hydrogenation with E being the least hydrogenated and W being the most hydrogenated. The E grade has a bromine number of 15, the R grade a bromine number of 5, the L grade a bromine number of 3 and the W grade has a bromine number of 1. Eastotac™ H-142R from Eastman Chemical Co. has a softening point of about 140° C. Other useful tackifying resins include Escorez™ 5300, 5400, and 5637, partially hydrogenated aliphatic petroleum hydrocarbon resins, and Escorez™ 5600, a partially hydrogenated aromatic modified petroleum hydrocarbon resin all available from Exxon Chemical Co. in Houston, Tex.; Wingtack™ Extra, which is an aliphatic, aromatic petroleum hydrocarbon resin available from Goodyear Chemical Co. in Akron, Ohio; Hercolite™ 2100, a partially hydrogenated cycloaliphatic petroleum hydrocarbon resin available from Hercules, Inc. in Wilmington, Del.; Norsolene™ hydrocarbon resins from Cray Valley; and Arkon™ water white, hydrogenated hydrocarbon resins available from Arakawa Europe GmbH.

In an embodiment, the tackifier includes aliphatic hydrocarbon resins such as resins resulting from the polymerization of monomers consisting of olefins and diolefins (e.g., ESCOREZ 1310LC, ESCOREZ 2596 from ExxonMobil Chemical Company, Houston, Tex. or PICCOTAC 1095, PICCOTAC 9095 from Eastman Chemical Company, Kingsport, Tenn.) and the hydrogenated derivatives thereof; alicyclic petroleum hydrocarbon resins and the hydrogenated derivatives thereof (e.g., ESCOREZ 5300 and 5400 series from ExxonMobil Chemical Company; EASTOTAC resins from Eastman Chemical Company). In some embodiments, the tackifiers include hydrogenated cyclic hydrocarbon resins (e.g., REGALREZ and REGALITE resins from Eastman Chemical Company).

In an embodiment, the tackifying agent is free of groups with which the silanol group of either the silane-grafted amorphous polyalpha-olefin or the silane-grafted ethylene/α-olefin multi-block copolymer will react.

In an embodiment, the tackifier is a hydrogenated cyclopentadiene-based tackifier with a softening point of about 115° C., available commercially under the trade name Eastotac H115 (available from Eastman Chemical).

The tackifier is present in the HMA composition in an amount from 5 wt %, or 9 wt %, or 10 wt %, or 15 wt %, or 19 wt % to 20 wt %, or 21 wt %, or 23 wt %, or 25 wt %, or 30 wt %. Weight percent is based on the total weight of the HMA composition.

C. Wax

The HMA composition includes a wax. The wax may be used to reduce the melt viscosity of the HMA composition. Nonlimiting examples of suitable waxes include propylene-based polymer waxes, paraffin waxes, microcrystalline waxes, polyethylene waxes, polypropylene waxes, by-product polyethylene waxes, Fischer-Tropsch waxes, oxidized Fischer-Tropsch waxes and functionalized waxes such as hydroxy stearamide waxes and fatty amide waxes. A "propylene-based polymer wax," as used herein, is a wax composed of polymerized propylene monomer and optional α-olefin comonomer.

In an embodiment, the propylene-based polymer wax is a propylene homopolymer wax. The propylene homopolymer wax is produced by way of Ziegler-Natta catalyst polymerization or metallocene catalyst polymerization yielding a Ziegler-Natta catalyzed propylene-based polymer wax or a metallocene-catalyzed propylene-based polymer wax respectively.

In an embodiment, the propylene-based polymer wax is a propylene homopolymer wax and excludes functionalized wax, polyethylene wax, Fischer-Tropsch wax, animal wax, plant wax, petroleum-derived wax (paraffin wax, microcrystalline wax), and montan wax.

In an embodiment, the propylene-based polymer wax is a propylene homopolymer wax and has, one, some, or all of the following properties:
(i) a density from 0.89 g/cc, or 0.90 g/cc to 0.91 g/cc; and
(ii) a melt viscosity (at 170° C.) from 50 MPa·s, or 55 MPa·s to 60 MPa·s, or 65 MPa·s, or 70 MPa·s.

Applicant discovered that propylene homopolymer wax has a higher crystallization temperature and a higher melting point than the other waxes described above, making the propylene homopolymer wax particularly suitable for use in HMA applications. Further, the propylene homopolymer-wax has higher compatibility with the PBPE component of the composition.

Nonlimiting examples of suitable propylene homopolymer wax are waxes sold under the tradename LICOCENE, available from Clariant.

The wax is present in the HMA composition in an amount from 1 wt %, or 2 wt %, or 5 wt %, or 7 wt %, or 9 wt % to 10 wt %, or 11 wt %, or 15 wt %, or 20 wt %, or 30 wt %. Weight percent is based on the total weight HMA composition.

In an embodiment, the holt melt adhesive composition includes:

A) a propylene based plastomer or elastomer (PBPE) including up to 10 wt % units derived from ethylene and having:
(i) a Koenig B-value less than 1.0;
(ii) a total unsaturation per mole of propylene from 0.010% to 0.030%;
(iii) a density from 0.870 g/cc to 0.890 g/cc;
(iv) a melt viscosity at 177° C. from 800 to 11,000 mPa·s, further from 900 to 11,000 mPa·s, and further from 1,000 mPa·s to 11,000 mPa·s;
(v) a weight average molecular weight from 24,00 to 50,000 g/mol;
B) a tackifier; and
C) a wax.

In an embodiment, the PBPE of the HMA composition has a density from 0.880 g/cc to 0.888 g/cc.

In an embodiment, the PBPE of the HMA composition has a melt viscosity at 177° C. from 800 mPa·s to 4,000 mPa·s, further from 900 mPa·s to 4,000 mPa·s, and further from 1,000 mPa·s to 4,000 mPa·s.

In an embodiment, the PBPE of the HMA composition contains from 5 wt % to 7 wt % units derived from ethylene.

In an embodiment, the PBPE has a total unsaturation per mole propylene from 0.015% to 0.017%.

D. Additives

The present HMA composition may include one or more additives. Nonlimiting examples of suitable additives include plasticizers, oils, stabilizers, antioxidants, pigments, dyestuffs, antiblock additives, polymeric additives, defoamers, preservatives, thickeners, rheology modifiers, humectants, fillers, solvents, nucleating agents, surfactants, chelating agents, gelling agents, processing aids, cross-linking agents, neutralizing agents, flame retardants, fluorescing agents, compatibilizers, antimicrobial agents, and water.

In an embodiment, the HMA composition includes an antioxidant. The antioxidant protects the HMA composition from degradation caused by reaction with oxygen induced by such things as heat, light, or residual catalyst from the raw materials such as the tackifying resin. Suitable antioxidants include high molecular weight hindered phenols and multifunctional phenols such as sulfur and phosphorous-containing phenol. Representative hindered phenols include; 1,3,5-trimethyl-2,4,6-tris-(3,5-di-tert-butyl-4-hydroxybenzyl)-benzene;pentaerythrityl tetrakis-3(3,5-d i-tert-butyl-4-hydroxyphenyl)-propionate; n-octadecyl-3(3,5-di-tert-butyl-4-hydroxyphenyl)-propionate; 4,4'-methylenebis(2,6-tert-butyl-phenol); 4,4'-thiobis(6-tert-butyl-o-cresol); 2,6-di-tertbutylphenol; 6-(4-hydroxyphenoxy)-2,4-bis(n-octyl-thio)-l,3,5 triazine; di-n-octylthio)ethyl 3,5-di-tert-butyl-4-hydroxy-benzoate; and sorbitol hexa[3-(3,5-di-tert-butyl-4-hydroxy-phenyl)-propionate].

Such antioxidants are commercially available from Ciba Specialty Chemicals and include Irganox® 565, 1010, 1076 and 1726 which are hindered phenols. These are primary antioxidants which act as radical scavengers and may be used alone or in combination with other antioxidants such as phosphite antioxidants like Irgafos® 168 available from Ciba Specialty Chemicals. Phosphite catalysts are considered secondary catalysts and are not generally used alone. These are primarily used as peroxide decomposers. Other available catalysts are Cyanox® LTDP available from Cytec Industries and Ethanox® 330 available from Albemarle Corp. Many such antioxidants are available either to be used alone or in combination with other such antioxidants. The antioxidant is present in the HMA composition in an amount from 0.1 wt %, or 0.5 wt % to 1.0 wt %, or 2.0 wt % or 3.0 wt %. Weight percent is based on total weight of the HMA composition.

In an embodiment, the HMA composition contains from 0.1 wt %, or 0.2 wt %, or 0.3 wt % to 0.6 wt %, or 0.8 wt % or 1.0 wt % antioxidant. Weight percent is based on total weight of the HMA composition.

The HMA composition is prepared by blending the components in a melt at a temperature from 170° C. to 180° C. to form a homogeneous blend.

In an embodiment, the HMA composition includes:
(A) from 55 wt % to 90 wt %, or from 60 wt % to 90 wt % PBPE;
(B) from 5 wt % to 30 wt %, or from 10 wt % to 30 wt % tackifier;
(C) from 0 wt % to 30 wt %, or from 1 wt % to 30 wt %, or from 5 wt % to 30 wt % wax; and
(D) optionally, from 0.01 wt % to 1.0 wt % antioxidant (HMA composition (1)).

The PBPE, tackifier, wax and antioxidant for HMA composition (1) can be any respective composition as previously disclosed herein. In an embodiment, HMA composition (1) has a heat stress greater than 55° C.

In an embodiment, HMA composition (1) has a peel adhesion failure temperature of greater than or equal to 60° C.

In an embodiment, HMA composition (1) has a fiber tear greater than 50% at a temperature from −40° C. to 60° C.

In an embodiment, HMA composition (1) has a viscosity at 177° C. from 1000 mPa·s to 2500 mPa·s.

E. Sorbitol-Based Nucleating Agent

In an embodiment, the HMA composition includes a sorbitol-based nucleating agent. A "sorbitol-based nucleating agent," as used herein, is a composition including at least one sorbitol molecule (as shown by structure (I) below), or derivatives thereof.

(I)

In an embodiment, the sorbitol-based nucleating agent forms nuclei for crystal growth, also known as spherulites, in the PBPE polymer melt. Spherulites are rounded aggregates of crystal structures with spherule textures, occurring by growing of lamellae with specific arrangement from crystal nucleus, and are observed by optical microscopy and cross polarized light. The term "nucleating agent" includes clarifying agents.

Bounded by no particular theory, it is believed that the present sorbitol-based nucleating agent forms a gel in the PBPE melt. As a gel, the sorbitol-based nucleating agent can be dispersed more evenly, or more finely, to provide more nucleation sites when compared to conventional nucleating agents that are solid particles within the melt. With more nucleation sites, crystallization and solidification of the PBPE melt proceeds more rapidly than with conventional nucleating agent. In this way, the sorbitol-based nucleating agent advantageously reduces the set time of the present HMA composition. The present HMA composition with sorbitol-based nucleating agent has a set time less than or equal to five seconds. The reduced set time enables processing speed to be increased in processes such as case and carton sealing, injection molding, extrusion processes.

Nonlimiting examples of suitable sorbitol-based nucleating agents include dibenzylidenesorbitol type, not only in the unsubstituted form but also in the singly or multiply alkyl-substituted form, methyl-substituted for example. Other suitable sorbitol-based nucleating agents include sorbitol derivatives, for example, 1,3:2,4 dibenzylidene sorbitol, 1,2,3,4-di-para-methylbenzylidene sorbitol, 1,2,3,4-dimeta, para-methylbenzylidene sorbitol, bis(4-propylbenzylidene) propyl sorbitol and mixtures thereof.

The sorbitol-based nucleating agents are commercially available from Milliken Chemical under the trade names Millad.

In an embodiment, the sorbitol-based nucleating agent is bis(4-propylbenzylidene) propyl sorbitol commercially available as Millad NX8000 from Milliken Chemical. The sorbitol-based nucleating agent is present in the HMA composition in an amount from 0.1 wt %, or 0.2 wt %, or 0.3 wt %, to 0.4 wt %, or 0.5 wt %, or 0.6 wt %, or 0.7 wt %, or 0.8 wt %, or 0.9 wt %, or 1.0 wt %.

In an embodiment, the HMA composition includes:
(A) from 55 wt % to 90 wt %, or from 60 wt % to 90 wt % PBPE;
(B) from 5 wt % to 40 wt %, or from 5 wt % to 30 wt %, or from 10 wt % to 39 wt % tackifier;
(C) from 0 wt % to 30 wt %, or from 1 wt % to 30 wt %, or from 5 wt % to 30 wt %, or from 10 wt % to 30 wt % wax;
(D) optionally, from 0.01 wt % to 1.0 wt % antioxidant; and
(E) from 0.1 wt % to 1.0 wt % sorbitol-based nucleating agent (HMA composition (2)).

In an embodiment, the HMA composition (2) includes from 0.1 wt % to 0.5 wt % sorbitol-based nucleating agent.

In an embodiment, the HMA composition (2) has a heat stress greater than 55° C. In a further embodiment, the HMA composition (2) has a heat stress from greater than 55° C., or 60° C., or 65° C., or 70° C., to 80° C., or 85° C., or 90° C.

The PBPE, tackifier, wax, antioxidant, and sorbitol-based nucleating agent for HMA composition (2) can be any respective composition as previously disclosed herein. In an embodiment, the HMA composition (2) has a peel adhesion failure temperature of from 70° C. to 75° C.

In an embodiment, the HMA composition (2) has a fiber tear greater than 50% at a temperature from −40° C. to 60° C. In a further embodiment, the HMA composition (2) has a fiber tear greater than 70% at a temperature from −40° C. to 60° C.

In an embodiment, the HMA composition (2) has a set time of less than or equal to 5 seconds. In a further embodiment, the HMA composition (2) has a set time from 0.5 seconds, or 1.0 second, or 1.5 seconds, or 2.0 seconds, or 2.5 seconds to 3.0 seconds, or 3.5 seconds, or 4.0 seconds, or 4.5 seconds, or 4.9 seconds.

In an embodiment, the HMA composition includes:
(A) from 68 wt % to 85 wt %, or from 69 wt % to 71 wt % PBPE;
(B) from 9 wt % to 23 wt %, or from 19 wt % to 21 wt % tackifier;
(C) from 0 wt % to 30 wt %, or from 1 wt % to 11 wt %, or from 9 wt % to 11 wt % wax;
(D) optionally, from 0.01 wt % to 1.0 wt % antioxidant; and
(E) from 0.1 wt % to 0.5 wt % sorbitol-based nucleating agent (HMA composition (3)).

The PBPE, tackifier, wax, antioxidant, and sorbitol-based nucleating agent for HMA composition (3) can be any respective composition as previously disclosed herein. In an embodiment, the HMA composition (3) has a crystallization temperature (Tc) greater than 95° C. and a set time less than 5 seconds. In a further embodiment, the HMA composition (3) has a crystallization temperature (Tc) greater than 95° C. and a set time from 0.5 seconds, or 1.0 seconds, or 1.5 seconds, or 2.0 seconds, or 2.5 seconds to 3.0 seconds, or 3.5 seconds, or 4.0 seconds, or 4.5 seconds, or 4.9 seconds.

The HMA composition may comprise two or more embodiments disclosed herein.

F. Article

The present disclosure provides an article. The article includes at least one component formed from the present HMA composition. The HMA composition can be any HMA composition as disclosed above. Nonlimiting examples of suitable articles include HMA bonded cardboard packaging boxes.

In an embodiment, that article includes a substrate. The HMA composition is on at least one surface of the substrate.

In an embodiment, the hot melt adhesive composition forms a seal between the at least one surface of the substrate and at least one surface of another substrate.

The demand for adhesive compositions with lower viscosity is increasing. A growing number of adhesive applications require the polymer component to have ultralow weight average molecular weight (Mw 50,000 or less) and narrow molecular weight distribution (Mw/Mn from 2.0 to 4.0). However, ultralow molecular weight olefin-based polymer typically has very low melt viscosity (typically less than 20,000 mPa·s or lower at 177° C.), making commercial-scale production (5 metric tons/hr) difficult due to the impediments of handling and processing such low viscosity material.

Applicant discovered that homogenization can be used to prepare low viscosity adhesive compositions. As used herein, "homogenization" is a process that reduces the viscosity of a material.

The present disclosure includes a process for homogenizing one or more olefin-based polymers. The term, "olefin-based polymer," as used herein, refers to a polymer that comprises, in polymerized form, a majority amount of olefin monomer, for example ethylene or propylene (based on the weight of the polymer), and optionally may comprise one or more comonomers. The olefin-based polymer can be any olefin-based polymer components disclosed above, such as the present PBPE, for example. Although the following disclosure is directed to olefin-based polymer, it is understood that the homogenization process can be applied to any individual adhesive component as well as to the final adhesive composition (such as a hot melt adhesive composition, for example). The present homogenization process advantageously reduces the viscosity of the polymer component of the adhesive composition mechanically, avoiding chemical viscosity reduction, such as visbreaking for example.

The process includes subjecting the olefin-based polymer or the adhesive composition to homogenization, and reducing the melt viscosity of the olefin-based polymer or the adhesive composition. In a further embodiment, the process includes reducing the melt viscosity of the olefin-based polymer or the adhesive composition from 10% to 40% of its initial viscosity prior to the homogenization.

In an embodiment, the homogenization step includes subjecting the olefin-based polymer (or adhesive composition) to high pressure homogenization. High pressure homogenization utilizes a high pressure homogenizer. A "high pressure homogenizer," (or HPH) as used herein, is a device that applies at least 100 bar hydrostatic pressure to a fluid substance and subsequently imposes a restricted flow to the fluid.

HPH includes placing the olefin-based polymer (or adhesive composition) in a melt state (polymer melt) or in an otherwise flowable state. A pressure pump delivers the polymer melt to a valve area of the HPH under high pressure, typically from 100 bar to 2000 bar. In the valve area, a homogenization gap is present between a valve seat and a valve. The homogenization gap is a minute space between the valve seat and the valve. As the polymer melt flows through and exits the homogenization gap, a rapid increase in velocity occurs simultaneously with a rapid decrease in pressure. The intense energy release at the homogenization gap causes turbulence and localized pressure breaking the individual chains of the olefin-based polymer. An impact ring may or may not be directly downstream the homogenization gap. Impingement of the polymer melt with the impact ring imparts further turbulence to the polymer melt exiting the homogenization gap. Bounded by no particular theory, it is believed one, some, or all of the following phenomena occur in the HPH and contribute to the viscosity reduction of the polymer melt (adhesive melt): high hydrostatic pressure, shear stress, cavitation, turbulence, impingement, and temperature increase.

In an embodiment, the HPH reduces the melt viscosity of the olefin-based polymer (or adhesive composition) from 10%, or 15%, or 20%, or 25% to 30% or 35% or 40%. The reduction in melt viscosity is based on the initial melt viscosity of the olefin-based polymer (or adhesive composition) prior to homogenization. The reduced-viscosity polymer melt continues through a channel of the HPH for movement to the next processing stage.

In an embodiment, the HPH is a two-stage high pressure homogenizer. The first-stage includes the pressure pump and valve area as described above. The second stage includes a second pressure pump and a second valve area that utilizes from 10% to 20% less pressure than the first stage in order to reduce cavitation and increase turbulent flow.

In an embodiment, the process includes introducing an olefin-based polymer (or adhesive composition) having a melt viscosity from 2500 mPa·s to 20,000 mPa·s (at 177° C.) into a high pressure homogenizer. The process includes subjecting the olefin-based polymer (or adhesive composition) to high pressure homogenization and forming an olefin-based polymer (or adhesive composition) with a melt viscosity from 1500 mPa·s to 12,000 mPa·s (at 177° C.).

In an embodiment, the process includes introducing a formulated adhesive composition having a melt viscosity from 800 mPa·s to 3500 mPa·s (at 177° C.) into a high pressure homogenizer. The process includes subjecting the formulated adhesive composition to high pressure homogenization and forming an adhesive composition having a melt viscosity from 480 mPa·s to 2100 mPa·s (at 177° C.).

The homogenization process may comprise two or more embodiments disclosed herein.

Definitions

The numerical ranges disclosed herein include all values from, and including, the lower value and the upper value. For ranges containing explicit values (e.g., 1 or 2, or 3 to 5, or 6, or 7) any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight, and all test methods are current as of the filing date of this disclosure.

The term "composition," as used herein, refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. The term polymer includes trace amounts of catalyst residue that may be incorporated into and/or within the polymer.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

Test Methods

Density

Density is measured in accordance with ASTM D-792. The result is reported in grams (g) per cubic centimeter, or g/cc.

Gel Permeation Chromatography (GPC)

A high temperature gel permeation chromatography (GPC) system, equipped with Robotic Assistant Deliver (RAD) system for sample preparation and sample injection. The concentration detector is an Infra-red detector (IR4) from Polymer Char Inc (Valencia, Spain). Data collection was performed using Polymer Char DM 100 Data acquisition box. The carrier solvent was 1,2,4-trichlorobenzene (TCB). The system was equipped with an on-line solvent degas device from Agilent. The column compartment was operated at 150° C. The columns were four Mixed A LS 30 cm, 20 micron columns. The solvent was nitrogen purged 1,2,4-trichlorobenzene (TCB) containing approximately 200 ppm 2,6-di-t-butyl-4-methylphenol (BHT). The flow rate is 1.0 mL/min, and the injection volume was 200 μl. A 2 mg/mL sample concentration was prepared by dissolving the sample in $N_2$ purged and preheated TCB (containing 200 ppm BHT), for 2.5 hrs at 160° C. with gentle agitation.

The GPC column set was calibrated by running twenty narrow molecular weight distribution polystyrene standards. The molecular weight (MW) of the standards ranges from 580 to 8,400,000 g/mol, and the standards were contained in six "cocktail" mixtures. Each standard mixture had at least a decade of separation between individual molecular weights. The equivalent polypropylene molecular weights of each PS standard were calculated by using following equation, with reported Mark-Houwink coefficients for polypropylene (Th.G. Scholte, N. L. J. Meijerink, H. M. Schoffeleers, and A. M. G. Brands, J. Appl. Polym. Sci., 29, 3763-3782 (1984)) and polystyrene (E. P. Otocka, R. J. Roe, N. Y. Hellman, P. M. Muglia, Macromolecules, 4, 507 (1971)):

$$M_{PP} = \left(\frac{K_{PS} M_{PS}^{a_{PS}+1}}{K_{PP}}\right)^{\frac{1}{a_{PP}+1}},$$

where $M_{pp}$ is PP equivalent MW, $M_{PS}$ is PS equivalent MW, log K and a values of Mark-Houwink coefficients for PP and PS are listed below.

| Polymer | a | log K |
|---|---|---|
| Polypropylene | 0.725 | −3.721 |
| Polystyrene | 0.702 | −3.900 |

A logarithmic molecular weight calibration was generated using a fourth order polynomial fit as a function of elution volume. Number average and weight average molecular weights were calculated according to the following equations:

$$M_n = \frac{\sum^i W f_i}{\sum^i (W f_i / M_i)}, \quad (2)$$

$$M_w = \frac{\sum^i (W f_i * M_i)}{\sum^i (W f_i)}, \quad (3)$$

where $Wf_i$ and $M_i$ are the weight fraction and molecular weight of elution component i, respectively.

Differential Scanning calorimetry (DSC)

Differential Scanning calorimetry (DSC) is used to measure crystallinity in the polymers (e.g., ethylene-based (PE) polymers). About 5 to 8 mg of polymer sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for polypropylene or "PP"). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)×100 (for PE)).

Unless otherwise stated, melting point(s) ($T_m$) of each polymer is determined from the second heat curve (peak Tm), and the crystallization temperature ($T_c$) is determined from the first cooling curve (peak Tc).

Melt Viscosity

Melt viscosity is measured using a Brookfield Viscometer Model, and a Brookfield RV-DV-II-Pro viscometer spindle 31 at 177° C. for the PBPE, at 177° C. for the adhesive composition and at 170° C. for the wax. The sample is poured into the chamber, which is, in turn, inserted into a Brookfield Thermosel, and locked into place. The sample chamber has a notch on the bottom that fits the bottom of the Brookfield Thermosel, to ensure that the chamber is not allowed to turn, when the spindle is inserted and spinning. The sample (approximately 8-10 grams of resin) is heated to the required temperature, until the melted sample is about one inch below the top of the sample chamber. The viscometer apparatus is lowered, and the spindle submerged into the sample chamber. Lowering is continued, until the brackets on the viscometer align on the Thermosel. The viscometer is turned on, and set to operate at a shear rate, which leads to a torque reading in the range of 40 to 60 percent of the total torque capacity, based on the rpm output of the viscometer. Readings are taken every minute for about 15 minutes, or until the values stabilize, at which point, a final reading is recorded.

Softening Point

Ring-and-ball softening point is measured using a Mettler Toledo FP900 Thermosystem according to ASTM E28.

Heat Stress

The heat stress resistance (heat stress) is measured according to the "Suggested Test Method for Determining the Heat Stress Resistance of Hot Melt Adhesives", method T-3006, prepared by the Institute of Packaging Professions (IoPP). To prepare one sample, two cardboard coupons (cut with flutes running in the long direction) having dimensions of 2 inches (50.8 mm)×3 3/16 in (81 mm) and 2 in (50.8 mm)×5 1/2 in (139.7 mm) are bonded by applying 0.00014 lb/in of HMA with an Olinger Bond Tester. The adhesive is applied perpendicular to the flutes in the center of the shorter coupon and the coupons are bonded such that the adhesive is 3/4 in (19 mm) from one end of the long coupon. Five replicates are made for each formulation. Samples are loaded into the sample holder with the short coupon end aligned with the edge of the sample holder. The samples are held in place with the wide plate secured by wingnuts. A 200 g weight is placed 3.94 in (100 mm) from the bond. The weight is secured by placing the peg on the weight into a hole made in the long coupon. The sample holder is then placed into a convection oven at a set temperature for 24 hours. If at least 80% of the bonds do not fail, then the sample is considered to have passing heat resistance at the test temperature. The oven temperature is varied until the maximum passing heat stress resistance is determined. All new bonded coupon samples should be used for each test temperature. Results are reported as heat stress temperature (° C.)

$^{13}$C NMR experimental procedure for propylene-ethylene copolymers $^{13}$C NMR is used for ethylene content, Koenig B-value, triad distribution, and triad tacticity and is performed as follows:

Sample Preparation (Propylene-Ethylene Copolymers)

The samples are prepared by adding approximately 2.7 g of a 50/50 mixture of tetrachloroethane-d$_2$/orthodichlorobenzene containing 0.025 M Cr(AcAc)$_3$ to 0.20-0.30 g sample in a Norell 1001-7 10 mm NMR tube. The samples are dissolved and homogenized by heating the tube and its contents to 150° C. using a heating block and heat gun. Each sample is visually inspected to ensure homogeneity.

Data Acquisition Parameters (Propylene-Ethylene Copolymers)

The data are collected using a Bruker 400 MHz spectrometer equipped with a Bruker Dual DUL high-temperature CryoProbe. The data are acquired using 320 transients per data file, a 6 sec pulse repetition delay, 90 degree flip angles, and inverse gated decoupling with a sample temperature of 120° C. All measurements are made on non-spinning samples in locked mode. Samples are allowed to thermally equilibrate for 7 minutes prior to data acquisition. Percent mm tacticity and wt % ethylene is then determined according to methods commonly used in the art.*

*REFERENCES

For composition (wt % E):
S. Di Martino and M. Kelchtermans; J. Appl. Polym. Sci., V 56, 1781-1787 (1995) Tacticity, detailed assignments:
V. Busico, R. Cipullo; Prog. Polym. Sci. V 26, 443-533 (2001)
The "Koenig B-value" or chi statistic is one measure of randomness or blockiness in a propylene ethylene random copolymer. A value of 1.0 indicates a random copolymer and a value of zero indicates complete blocks of monomers A and B. A B-value of 2 indicates an alternating copolymer. B=[EP]/(2[P][E]), where [EP] is the total mole fraction of EP dimers (EP+PE, or (EEP+PPE+PEP+EPE)), and [E] is the mole fraction ethylene, and [P]=1−[E]. Koenig, Jack L.; Spectroscopy of Polymers, 2nd ed.

Peel Adhesion Failure Temperature (PAFT)—Peel adhesion failure temperature (PAFT) was tested according to ASTM D 4498 with a 100 gram weight in the peel mode. The tests were started at room temperature (25° C./77° F.) and the temperature was increased at an average rate of 0.5° C./minute.

Samples for PAFT testing are prepared using two sheets of 40 pound Kraft paper, each of about 6×12 in (152×305 mm) dimensions. On the bottom sheet, lengthwise and separated by a gap of 1 in (25 mm), are adhered in parallel fashion two 1.75 in or 2 in (45 mm or 51 mm) wide strips of a one sided, pressure-sensitive tape such as masking tape. The adhesive sample to be tested is heated to 177° C. (350° F.) and is drizzled in an even manner down the center of the gap formed between the tape strips. Then before the adhesive can unduly thicken two glass rods, one rod riding immediately upon the tapes and shimmed on each side of the gap with a strip of the same tape followed by the second rod and (between the two rods) the second sheet of paper, are slid down the length of the sheets. This is done in a fashion such that the first rod evenly spreads the adhesive in the gap between the tape strips and the second rod evenly compress the second sheet over the top of the gap and on top of the tape strips. Thus a single 1 inch (25.4 mm) wide strip of sample adhesive is created, between the two tape strips, and bonding the paper sheets. The sheets so bonded are cut crosswise into strips of width 1 inch (25.4 mm) and length of about 3 inches (76.2 mm), each strip having a 1×1 in (25×25 mm) adhesive sample bond in the center. The strips may then be employed in the PAFT testing, as desired.

Fiber Tear (%) Percent fiber tear (FT) of HMAs using Inland corrugated cardboard was determined according to a standardized method. A bead of adhesive was applied on to a cardboard coupon (5×6 cm) using an Olinger Bond Tester and a second coupon was quickly placed on top of the adhesive. Light finger pressure for ca. 3 seconds was applied to hold the bond in place. Samples were conditioned for at least 4 hours at room temperature and 50% relative humidity. Next, samples were conditioned at the test temperatures for 5 hrs to 24 hrs. Samples (n=5) were pulled apart by hand and the failure mode (fiber tear, cohesive failure, adhesive failure) was recorded.

Open Time and Set Time

Set Time and Open Time properties are determined using the Olinger Bond Tester, a mechanical testing device used to form and tear test bonds.

The Olinger Bond Tester is heated to 350° C. (177° C.). The bottom substrate, 2.5" (63.5 mm)×2" (50.8 mm) corrugated board, moves on a track under the adhesive pot which delivers a bead of polymer approximately 1/16" (1.6 mm) to 1/8" (3.2 mm) wide, and 1" (25.4 mm) long. The adhesive pot pressure is increased or decreased in order to maintain consistent bead size. A top substrate, 2.5" (63.5 mm)×2" (50.8 mm), is applied to the bottom substrate, with a pressure of 2 bars. The Olinger has 2 timers, capable of measuring set-time and open-time potential to the nearest second.

Open Time measurement—is the longest time period between adhesive application to one substrate, and the bonding with a second substrate, that results in a 75% fiber-tearing bond. For testing, compression time (or set time) is set to the time determined by set time measurement to achieve 100% fiber tear. Open time is set at 10 seconds and increased in 10 second intervals until less than 50% fiber tear is achieved. The open time is decreased by 5 sec and % fiber tear determined. Finally, open time is changed by 1 second interval to determine the maximum allowable time to achieve 75% or greater fiber tear.

Set Time measurement—is the minimum compression time required to achieve a fiber-tearing bond. For testing, open time is set at 2 seconds (sec). A bond is formed as the top substrate is compressed onto the bottom substrate. After a preset compression time, a tear test is executed as the top substrate is pulled from the bottom substrate. A visual assessment is then made to determine the percentage of fiber tear achieved under the preset test conditions. The set time is changed in one second intervals, determining the time to achieve 100% fiber tear and less than 75% fiber tear. The set time is recorded as the shortest time, to the nearest second, at which a minimum of 75% fiber tear is obtained.

Some embodiments of the present disclosure will now be described in detail in the following Examples.

EXAMPLES

1. Preparation of PBPE

Seven PBPEs are produced utilizing a hafnium metal complex of a polyvalent aryloxyether catalyst. Catalyst A is a hafnium metal complex of a polyvalent aryloxyether catalyst that is hafnium, [[2',2'''-[(1R,2R)-1,2-cylcohexanediylbis(methyleneoxy-κO)] bis[3-(9H-carbazol-9-yl)-5-methyl[1,1'-biphenyl]-2-olato-κO]](2-)]dimethyl.

Catalyst B is a hafnium metal complex of a polyvalent aryloxyether catalyst that is hafnium, [[2',2'''-[1,3-propanediylbis(oxy-κO)]bis-{3-[9H-3,6-di-(1,1-dimethylethyl)-carbazol-9-yl]}-5'-fluoro-5-(1,1,3,3-tetramethylbutyl)-[1,1'-biphenyl]-2-olato-κO]]2-)]dimethyl.

Table 1 below provides the name and structure for Catalyst A and Catalyst B.

TABLE 1

Hafnium metal complex of a polyvalent aryloxyether catalysts

| Catalyst A | Catalyst B |
|---|---|
| hafnium, [[2',2'''-[(1R,2R)-1,2-cylcohexanediylbis(methyleneoxy-κO)]bis[3-(9H-carbazol-9-yl)-5-methyl[1,1'-biphenyl]-2-olato-κO]](2-)]dimethyl | hafnium, [[2',2'''-[1,3-propanediylbis(oxy-κO)bis-{3-[9H-3,6-di-(1,1-dimethylethyl)-carbazol-9-yl]}-5'-fluoro-5-(1,1,3,3-tetramethylbutyl)-[1,1'-biphenyl]-2-olato-κO]](2-)]dimethyl |
|  |  |

Each PBPE is made according to the following procedure. Catalyst A and cocatalyst component solutions are metered using pumps and mass flow meters and are combined with the catalyst flush solvent and introduced into the bottom of the reactor. The cocatalyst used is a long-chain alkyl ammonium borate of approximate stoichiometry equal to methyl di(octadecyl)ammonium tetrakis(pentafluorophenyl)borate (MDB) combined with a tertiary component, tri(isobutyl) aluminum modified methalumoxane (MMAO) containing a molar ratio of i-butyl/methyl groups of about 1/3. For Catalyst A, the cocatalyst is in a molar ratio based on Hf of 1.2/1, and MMAO (25/1 Al/Hf). For Catalyst B, the cocatalyst is in a molar ratio based on Hf of 1.2/1, and MMAO (25/1 Al/Hf).

The polymerization process is exothermic. There are about 900 British thermal units (BTUs) are released per pound (2009 kJ/kg) of propylene polymerized and about 1,500 BTUs released per pound (3489 kJ/kg) of ethylene polymerized. The primary process design consideration is the removal of the heat of reaction. The propylene-ethylene (P-E) copolymers are produced in a low-pressure, solution polymerization loop reactor, made up of a 3 inch (76 mm) loop pipe plus two heat exchanges, the total volume of which is 31.4 gallons (118.9 liter). Solvent and monomer (propylene) are injected into the reactor as a liquid. The comonomer (ethylene) gas is fully dissolved in the liquid solvent. The feed is cooled to 5° C. before injection into the reactor. The reactor operates at polymer concentration from 15 wt % to 20 wt %. The adiabatic temperature rise of the solution accounts for some of the heat removal from the polymerization reaction. Heat exchangers within the reactor are utilized to remove the remaining heat of reaction allowing for reactor temperature control at the reaction temperatures.

The solvent used is a high purity iso-paraffinic fraction available from Exxon under the trademark Isopar E. Fresh propylene is passed through a bed of Selexsorb COS for purification before mixing with a recycle stream containing solvent, propylene, ethylene, and hydrogen. After mixing with the recycle stream, the combined stream is passed through a bed of 75 wt % Molecular Sieve 13X and 25 wt % Selexsorb CD for further purification before using a high pressure 700 psig (4826 kPa) feed pump to pass the contents to the reactor. Fresh ethylene is passed through a Selexsorb COS bed for purification before compressing the stream to 750 psig (5171 kPa). Hydrogen (a telogen used to reduce molecular weight) is mixed with the compressed ethylene before the two are mixed/dissolved into the liquid feed. The total stream is cooled to an appropriate feed temperature (5° C.). The reactor operates at 500-525 psig (3447-3619 kPa) and the control temperature is reported in Table 1A. The propylene conversion in the reactor is maintained by controlling the catalyst injection rate. The reaction temperature is maintained by controlling the water temperature across the shell side of the heat exchanger at 85° C. The residence time in the reactor is short (about 10 minutes). The propylene conversion per reactor pass is also reported in Table 1A.

Upon exiting the reactor, water and additive are injected into the polymer solution. The water hydrolyzes the catalyst, terminating the polymerization reaction. The additives consist of antioxidants, i.e., 500 ppm of a phenolic and 1000 ppm of a phosphite, which remain with the polymer and act as stabilizers to prevent polymer degradation while in storage before subsequent fabrication at an end-user's facility. The post-reactor solution is super-heated from reactor temperature to 230° C. in preparation for a two-stage devolatilization. The solvent and unreacted monomers are removed during the devolatilization process. The polymer melt is pumped to a die for underwater pellet cutting.

Solvent and monomer vapors exiting the top of the devolatilizers are sent to a coalescer. The coalescer removes polymer entrained in the vapor during devolatilization. The clean vapor stream leaving the coalescer is partially condensed through a series of heat exchangers. The two-phase mixture enters a separation drum. The condensed solvent and monomers are purified (this is the recycle stream described above) and re-used in the reaction process. The vapors leaving the separating drum, mostly containing propylene and ethylene, are sent to a block flare and burned.

The process conditions for PBPEs produced by the foregoing process are provided in Table 1A below.

TABLE 1A

Process Conditions for PBPE1-7

|  | PBPE1 | PBPE2 | PBPE3 | PBPE4 | PBPE5 | PBPE6 | PBPE7 |
|---|---|---|---|---|---|---|---|
| Reactor Control Temp. (° C.) | 130 | 130 | 130 | 130 | 150 | 140 | 140 |
| Solvent (Isopar-E) Feed (lb/hr) | 34.52 | 34.48 | 34.44 | 15.87 | 779.02 | 17.75 | 17.75 |
| Propylene Feed (lb/hr) (monomer) | 34.52 | 34.48 | 34.44 | 8.80 | 240.95 | 8.40 | 8.40 |
| Ethylene Feed (lb/hr) (comonomer) | 0.47 | 0.60 | 0.43 | 0.47 | 15.59 | 0.72 | 0.72 |
| Reactor Propylene Conversion (wt %) | 86.49 | 86.04 | 86.16 | 95.57 | 90.59 | 89.68 | 90.48 |
| Hydrogen Feed (SCCM) | 144.96 | 159.96 | 175.01 | 158.48 | 4849.42 | 217.98 | 254.08 |
| Catalyst Flow (lb/hr) | 0.16 | 0.13 | 0.16 | 0.15 | 1.48 | 0.29 | 0.29 |
| Catalyst Conc. (ppm) | 8.60 | 8.60 | 8.60 | 4.79 | 99.98 | 8.99 | 8.99 |
| Cocatalyst-1 Flow (lb/hr) | 0.18 | 0.15 | 0.18 | 0.09 | 1.66 | 0.19 | 0.19 |
| Cocatalyst-1 Conc. (ppm) | 61.53 | 61.53 | 61.53 | 64.46 | 1196.07 | 112.81 | 112.81 |
| Cocatalyst-2 Flow (lb/hr) | 0.24 | 0.20 | 0.23 | 0.26 | 0.75 | 0.17 | 0.17 |
| Cocatalyst-2 Conc. (ppm) | 8.79 | 8.79 | 8.79 | 9.77 | 1196.07 | 22.95 | 22.95 |

The properties for PBPEs produced by the foregoing process are provided in Table 2 below.

TABLE 2

Properties for PBPE1-7

| PBPE | Catalyst | Wt % C2* | Density | PBPE Viscosity @ 177° C. (mPa·s) | Tm (° C.) | Tc (° C.) | % Cryst | $H_f$ (J/g) | Mn | Mw | Mw/Mn | B-value | total mole % unsat/ mol propylene | Isotact (% mm) (% mr) (% rr) |
|---|---|---|---|---|---|---|---|---|---|---|---|---|---|---|
| PBPE 1 | B | 6.7 | 0.8823 | 9058 | 99.70 |  | 32.0 | 52.8 | 13,500 | 45,742 | 3.39 | 0.92 | 0.0167 | 93.3 3.4 3.3 |
| PBPE 2 | B | 8.9 | 0.875 | 10360 | 91.70 |  | 23.1 | 38.2 | 21,192 | 43,199 | 2.04 | 0.92 | 0.0182 | 92.8 3.3 3.9 |
| PBPE 3 | B | 6.1 | 0.884 | 4100 | 102.95 |  | 29.1 | 63.1 | 13,060 | 34,707 | 2.66 | 0.93 | 0.0166 | 93.4 3.2 3.4 |
| PBPE 4 | B | 3.6 | 0.8880 | 3600 | 113.71 |  | 38.3 | 54.0 | 18,518 | 38,439 | 2.08 | 0.96 | 0.0236 | 93.1 3.7 3.2 |
| PBPE 5 | A | 5.5 | 0.885 | 3389 | 104.1 | 67.25 | 32.7 | 50.4 | 16,309 | 38,155 | 2.34 | 0.92 | 0.0164 | 94.8 2.8 2.4 |
| PBPE 6 | A | 6.0 | 0.885 | 1455 | 103.0 | 71.4 | 28.4 | 50.4 | 11,815 | 26,914 | 2.28 | 0.94 | 0.0186 | 94.6 2.4 3.0 |
| PBPE 7 | A | 5.7 | 0.8848 | 1042 | 104.8 | 72.9 | 28.0 | 46.2 | 10,708 | 24,259 | 2.27 | 0.95 | 0.0176 | 96.4 1.7 2.0 |

*wt % C3 present in PBPE = 100 − (wt % C2 in Table 2)

A. Isotacticty in Table 2 is Determined with $^{13}C$ NMR.

The samples are prepared by adding approximately 2.6 g of a 50/50 mixture of tetrachloroethane-d2/orthodichlorobenzene that is 0.025M in chromium acetylacetonate (relaxation agent) to 0.2 g sample in a 10 mm NMR tube. The samples were dissolved and homogenized by heating the tube and its contents to 150° C. The data were collected using a Bruker 400 MHz spectrometer equipped with a Bruker Dual DUL high-temperature CryoProbe. The data was acquired using 160 scans per data file, a 6 second pulse repetition delay with a sample temperature of 120° C. The acquisition was carried out using spectral width of 25,000 Hz and a file size of 32K data points.

B. B-Value

Koenig B-Value

The Koenig B value or chi statistic is one measure of randomness or blockiness in an AB copolymer. A value of 1.0 indicates a random copolymer and a value of zero indicates complete blocks of monomers A and B. A B-value of 2 indicates an alternating copolymer. B=[EP]/(2[P][E]), where [EP] is the total mole fraction of EP dimers (EP+PE, or (EEP+PPE+PEP+EPE)), and [E] is the mole fraction ethylene, and [P]=1−[E]. Koenig, Jack L.; Spectroscopy of Polymers, 2nd Ed.

C. Total mole % propylene unsaturation— is determined with the following calculation.

Moles of H from propylene

Mol fraction propylene ∗ (integral area $\delta$ 3.5 − 0.2 ppm)

Total moles propylene $$\frac{\text{moles H from propylene}}{6 \text{ protons}}$$

Mol % vinyl unsaturation/mol propylene $$\frac{100 * \text{moles vinyl}}{\text{Total moles propylene}}$$

Mol % Cis/Trans Unsaturation /mol propylene $$\frac{100 * \text{moles } cis/trans}{\text{Total moles propylene}}$$

Mol % trisubstituted unsaturation /mol propylene $$\frac{100 * \text{moles } trisub}{\text{Total moles propylene}}$$

Mol % vinylidene unsaturation /mol propylene $$\frac{100 * \text{moles vinylidene}}{\text{Total moles propylene}}$$

Total mol % unsaturation/mol propylene

Mol % vinyl + Mole cis & trans + Mol % trisub + Mol + vinylidene

2. Production of Hot Melt Adhesive Compositions

Materials used to produce hot melt adhesive compositions are provided in Table 3 below.

TABLE 3

Starting materials for hot melt compositions

| Component | Specification | | | Source |
|---|---|---|---|---|
| PBPE 1-7 | See above, Table 2 | | | The Dow Chemical Company |
| Eastotac H115R (H115) | Tackifier - hydrogenated hydrocarbon resin | | | Eastman |
| | Property | Test Method | Value/Units | |
| | Ring and Ball Softening Point | ASTM E 28 | 115° C. | |
| | Color, Gardner | ASTM D 1544 | 1.5 | |
| | Color, Gardner (Molten) | ASTM D 1544 | 4 | |
| | Density | | 1.04 g/mL | |
| | Viscosity, Brookfield @ 190° C. | | 400 mPa · s | |
| | Form | | Flake | |
| | Bromine Number | | 5 | |
| | Glass Transition Temperature ($T_g$) | | 53° C. (midpoint) | |
| Licocene PP 6102 (6102) | wax - metallocence-catalyzed polypropylene wax, white fine grain crystallization temp 94.2° C. | | | Clariant |
| | drop point | 145° C. | | |
| | viscosity at 170° C. | 60 mPa · s | | |
| | density | 0.90 g/cc | | |
| | acid value | 0 mg KOH/g | | |
| NX8000 (s-based NA) | Sorbitol-based nucleating agent | | | Millad |
| Hyperform HPN-68L (comp NA) | Nucleating agent, non-sorbitol-based | | | Milliken |
| Irganox ® 1010 (AO) | Antioxidant pentaerythritol tetrakis(3-(3,5-di-tert-butyl-4-hydroxyphenyl)propionate) CAS 6683-19-8 | | | BASF |
| | Density | 1.15 g/cc | | |
| | Flashpoint | 297° C. | | |

The starting materials from Table 3 above are weighed and then blended at 177° C. for 30 min at 100 rounds per minute (rpm) using a small bowl Haake blender. The HMA compositions are provided in Table 4 below.

TABLE 4

Holt melt adhesive compositions*

| | Polymer | Polymer | Tackifier (H115) | Wax (6102) | AO | S-based NA (NX8000) | Comp NA (HPN68L) | Set Time (sec) | Open Time (sec) | 2$^{nd}$ heat Tm1 (° C.) | 2$^{nd}$ heat Tm2 (° C.) | 1$^{st}$ cool Tc1 (° C.) | 1$^{st}$ cool Tc2 (° C.) |
|---|---|---|---|---|---|---|---|---|---|---|---|---|---|
| Example 1 | PBPE5 | 69.65 | 19.9 | 9.95 | 0.5 | — | — | 20 | 75 | 103.94 | | 69.22 | |
| Example 2 | PBPE5 | 69.615 | 19.89 | 9.945 | 0.5 | 0.05 | — | 7 | 30 | | | | |
| Example 3 | PBPE5 | 69.58 | 19.88 | 9.94 | 0.5 | 0.1 | — | 3 | 16 | 98.05 | 116.84 | 77.33 | 98 |
| Example 4 | PBPE5 | 69.51 | 19.86 | 9.93 | 0.5 | 0.2 | — | 2 | 15 | 98.39 | 119.24 | 76.49 | 103 |
| Example 5 | PBPE5 | 69.44 | 19.84 | 9.92 | 0.5 | 0.3 | — | 5 | 30 | 98.63 | | 75.52 | 101 |
| Example 6 | PBPE5 | 99.3 | — | — | 0.5 | 0.2 | — | | | | | | |
| Comparative A | PBPE5 | 69.65 | 19.9 | 9.95 | 0.5 | — | 0.2 | 20 | 25 | 103.19 | | 73.56 | |
| Example 7 | PBPE6 | 68.6 | 22.9 | 8.6 | — | — | — | 14 | 50 | | | | |
| Example 7M | PBPE6 | 68.6 | 22.9 | 8.6 | — | 0.2 | — | 2 | 28 | | | | |
| Example 8 | PBPE7 | 81.5 | 16.3 | 2.2 | — | — | — | 11 | 43 | | | | |
| Example 8M | PBPE7 | 81.5 | 16.3 | 2.2 | — | 0.2 | — | 1 | 28 | | | | |
| Example 20 | PBPE7 | 80.0 | 20.0 | — | 0.5 | 0.2 | — | 2 | 19 | | | | |
| Example 21 | PBPE7 | 85.0 | 15.0 | — | 0.5 | 0.2 | — | 2 | 20 | | | | |

*Table 4 values are parts in weight

As shown in Table 4 above, HMA composition with s-based nucleating agent addition greater than 0.05% reduced set time to be 5 seconds or less. On the contrary, HMA composition with the comp NA addition of similar level did not show effect in set time reduction. Examples 8M, 20 and 21 demonstrate that hot melt adhesive compositions containing 2.2 wt % or less wax, with greater than 0.05 wt % s-based nucleating agent also exhibit a reduced set time of 5 seconds or less. A fast packaging line, which is typically in the range of sealing 30 to 50 boxes per minute, requires that the adhesive will set up quickly because the boxes are sealed at such a high speed. A set time of 5 seconds or less indicates that an adhesive composition is suitable for the fast speed of a packaging line.

Figure 1:
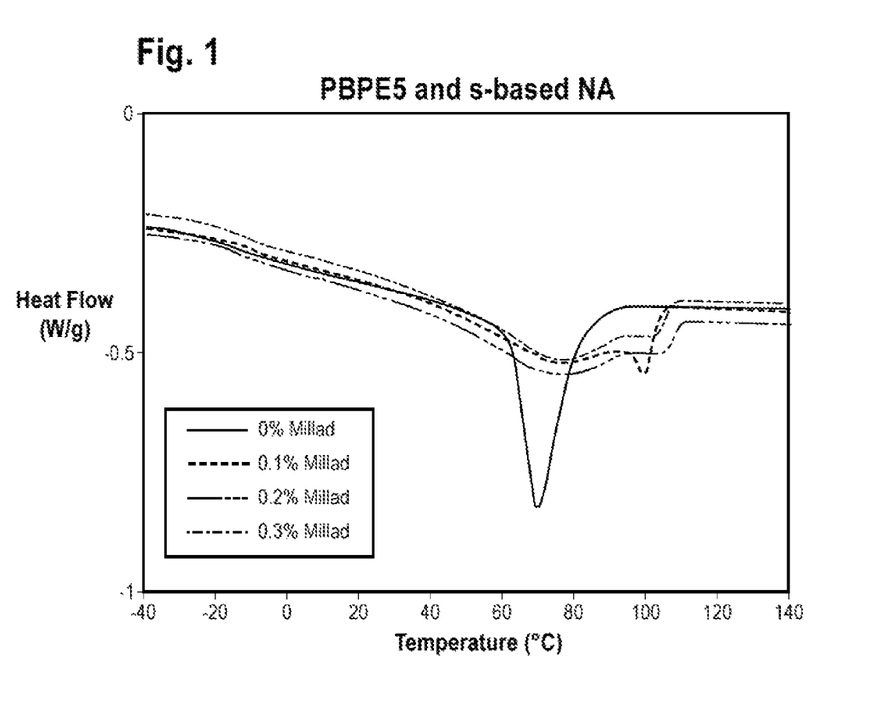
FIG. 1 is a graph showing a DSC cooling curve for a comparative sample and DSC cooling curves for embodiments of the present disclosure.
Figure 2:
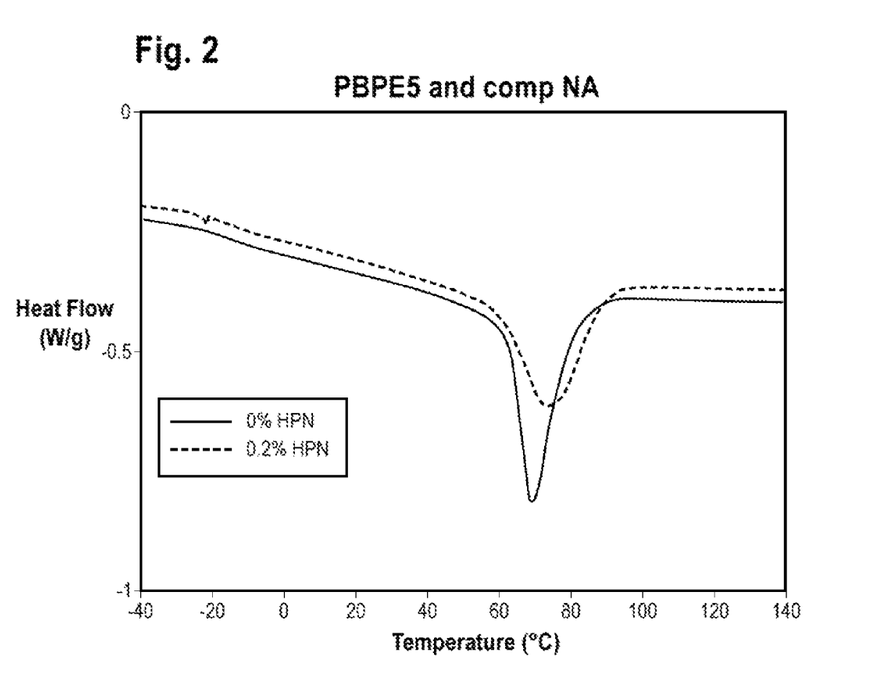
FIG. 2 is a graph showing DSC cooling curves for comparative samples.

FIG. 1 shows DSC curves of PBPE5 with varying amounts of s-based NA. FIG. 2 shows DSC curves of PBPE5 with various amounts of comp NA. Cooling curves shown in FIG. 1 and FIG. 2 demonstrate that s-based NA is effective in increasing a part of a material's crystallization peak temperature to be above 95° C. while the comp NA does not show this effect.

Figure 3:
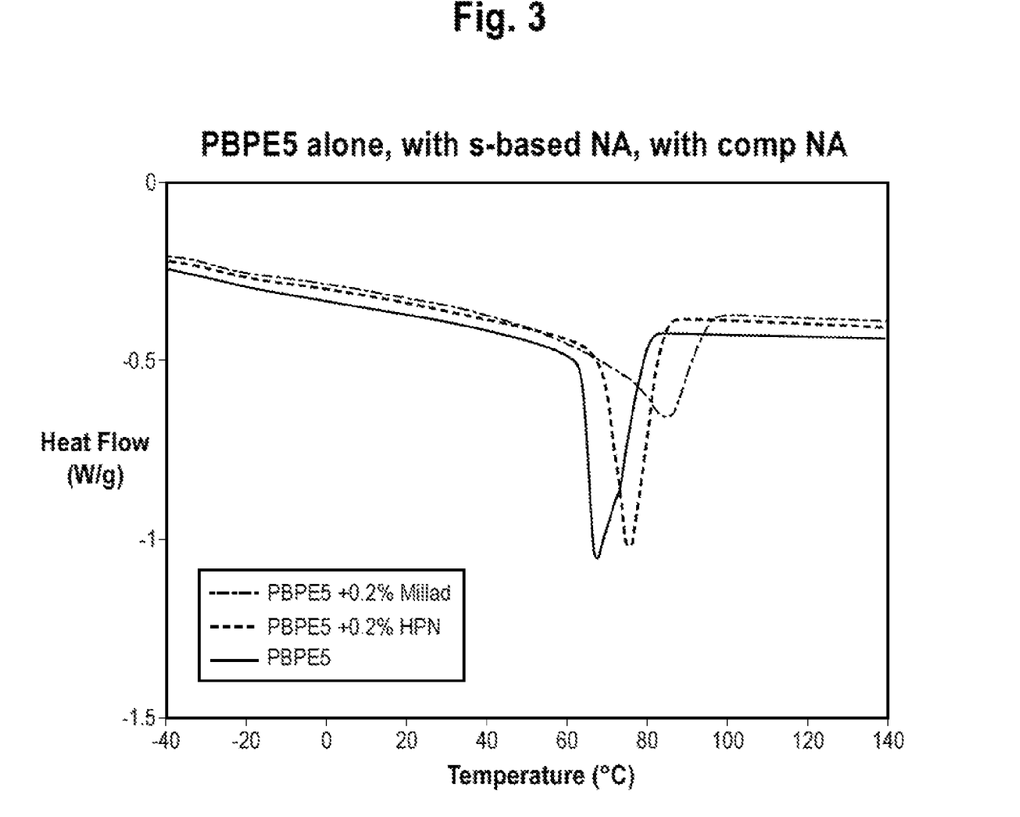
FIG. 3 is a graph showing DSC cooling curves for two comparative samples and a DSC cooling curve for an embodiment of the present disclosure.

Further investigation on the effect of nucleating agent on formulation component is done by adding each nucleating agent to Licocene or PBPE alone. The DSC results are shown FIG. 3. FIG. 3 shows DSC curves of compositions containing PBPE5, PBPE5 and s-based NA, and PBPE5 and comp NA. When added to PBPE, the s-based nucleating agent shows greater effect in increasing the crystallization temperature of the matrix material.

The application performance data are shown in Table 5. Addition of s-based NA maintained the excellent adhesive performance such as high PAFT and high fiber tear across broad temperature range from −40 to 60° C.

TABLE 5

Hot melt adhesive composition and properties[††]

| Example | Polymer | Polymer | Tackifier | Wax | AO | s-based NA | Viscosity[†] @ 177° C. mPa·s | Heat Stress ° C. | PAFT ° C. | Fiber Tear % |||||
|---|---|---|---|---|---|---|---|---|---|---|---|---|---|---|
| | | | | | | | | | | −40° C. | 17° C. | 5° C. | 23° C. | 60° C. |
| 10 | PBPE1 | 72.1375 | 17.4125 | 9.995 | 0.5 | 0 | 4409 | 70 | 76.5 | 100 | 100 | 100 | 100 | 100 |
| 11 | PBPE2 | 72.5 | 17.4125 | 9.995 | 0.5 | 0 | 4961 | 50 | 65.7 | 100 | 99 | 100 | 98 | 58 |
| 12 | PBPE3 | 59.7 | 19.9 | 19.9 | 0.5 | 0 | 1250.73 | 55 | 60.7 | 99 | 96 | 100 | 100 | 100 |
| 13 | PBPE4 | 59.7 | 19.9 | 19.9 | 0.5 | 0 | 1367.21 | 85 | 65.6 | 64 | 28 | 85 | 93 | 98 |
| 14 | PBPE5 | 69.65 | 19.9 | 9.95 | 0.5 | 0 | 1684.64 | 70 | 70.1 | 98 | 59 | 77 | 91 | 100 |
| 15 | PBPE5 | 79.6 | 9.95 | 9.95 | 0.5 | 0 | 2069.56 | 70 | 76.9 | 100 | 94 | 100 | 95 | 91 |
| 16 | PBPE5 | 79.6 | 19.9 | 0 | 0.5 | 0 | 2439.48 | 75 | 81.6 | 100 | 94 | 100 | 99 | 100 |
| 17* | PBPE5 | 69.65 | 19.9 | 9.95 | 0.5 | 0 | 1748.6 | | 74.0 | 99 | 97 | 99 | 100 | 100 |
| 18** | PBPE5 | 69.44 | 19.84 | 9.92 | 0.5 | 0.3 | 1778.6 | | 71.4 | 100 | 74 | 97 | 100 | 100 |
| 7 | PBPE6 | 68.6 | 22.9 | 8.6 | 0 | 0 | 805.3 | 65 | 58.97 | 93 | 90 | 85 | 78 | 95 |
| 8 | PBPE7 | 81.5 | 16.3 | 2.2 | 0 | 0 | 797.8 | 75 | 57.02 | 77 | 99 | 94 | 81 | 77 |
| 19 | PBPE7 | 78.9 | 19.7 | 1.4 | 0 | 0 | 799.3 | 75 | 58.38 | 97 | 91 | 92 | 100 | 97 |
| 20 | PBPE7 | 80.0 | 20.0 | 0 | 0.5 | 0.2 | 803.83 | 90 | 54.6 | 100 | 93 | 94 | 100 | 97 |
| 21 | PBPE7 | 85.0 | 15.0 | 0 | 0.5 | 0.2 | 848.82 | 90 | 62.6 | 100 | 97 | 97 | 94 | 52 |

[††]Table 5 values are parts in weight
[†]Viscosity of the hot melt adhesive composition
*same as Example 1 from Table 4
**same as Example 5 from Table 4

The present disclosure may be embodied in other forms without departing from the spirit and the essential attributes thereof, and, accordingly, reference should be made to the appended claims, rather than to the foregoing specification, as indicating the scope of the disclosure.

We claim:
1. An adhesive composition comprising:
A) a propylene based plastomer or elastomer (PBPE) comprising up to 10 wt % units derived from ethylene and having:
(i) a Koenig B-value less than 1.0;
(ii) a total unsaturation per mole of propylene from 0.010% to 0.030%;
(iii) a density from 0.870 g/cc to 0.890 g/cc;
(iv) a melt viscosity at 177° C. from 800 mPa·s to 11,000 mPa·s;
(v) a weight average molecular weight from 20,000 to 50,000 g/mol; and
(vi) a Mw/Mn from 2.0 to 4.0;
B) a tackifier; and
C) a wax.

2. The composition of claim 1 wherein the composition is a hot melt adhesive composition.

3. The composition of claim 1 wherein the PBPE has a density from 0.880 g/cc to 0.888 g/cc.

4. The composition of claim 1, wherein the PBPE has a melt viscosity at 177° C. from 800 mPa·s to 2,500 mPa·s.

5. The composition of claim 1, wherein the PBPE comprises from 5 wt % to 7 wt % units derived from ethylene.

6. The composition of claim 1, wherein the PBPE has a total unsaturation per mole propylene from 0.015% to 0.017%.

7. The composition of claim 1 comprising:
(A) from 55 wt % to 90 wt % PBPE;
(B) from 5 wt % to 30 wt % tackifier;
(C) from 1 wt % to 30 wt % wax; and
(D) from 0.01 wt % to 1.0 wt % antioxidant.

8. The composition of claim 7, wherein the composition has a heat stress greater than 55° C.

9. The composition of claim 7, wherein the composition has a peel adhesion failure temperature greater than or equal to 60° C.

10. The composition of claim 7, wherein the composition has a fiber tear greater than 50% at a temperature from −40° C. to 60° C.

11. The composition of claim 7, wherein the composition has a melt viscosity at 177° C. from 1000 mPa·s to 2500 mPa·s.

12. The composition of claim 1, wherein the composition comprises (E) a sorbitol-based nucleating agent.

13. The composition of claim 12 comprising:
(A) from 55 wt % to 90 wt % PBPE;
(B) from 5 wt % to 30 wt % tackifier;

(C) from 1 wt % to 30 wt % wax;
(D) from 0.01 wt % to 1.0 wt % antioxidant; and
(E) from 0.1 wt % to 1.0 wt % sorbitol-based nucleating agent.

14. The composition of claim 13, wherein the composition has a heat stress greater than 55° C.

15. The composition of claim 13, wherein the composition has a peel adhesion failure temperature from 70° C. to 75° C.

16. The composition of claim 13, wherein the composition has a fiber tear greater than 50% at a temperature from −40° C. to 60° C.

17. The composition of claim 13, wherein the composition has a set time of less than or equal to 5 seconds.

18. The composition of claim 13 wherein the composition comprises:
(A) from 68 wt % to 85 wt PBPE;
(B) from 9 wt % to 23 wt % tackifier;
(C) from 1 wt % to 11 wt % wax;
(D) from 0.01 wt % to 1.0 wt % antioxidant; and
(E) from 0.1 wt % to 0.5 wt sorbitol-based nucleating agent.

19. The composition of claim 18 wherein the composition has a crystallization temperature (Tc) greater than 95° C. and a set time less than 5 seconds.

20. An article comprising at least one component formed from the composition of claim 1.

* * * * *